Figure 1:
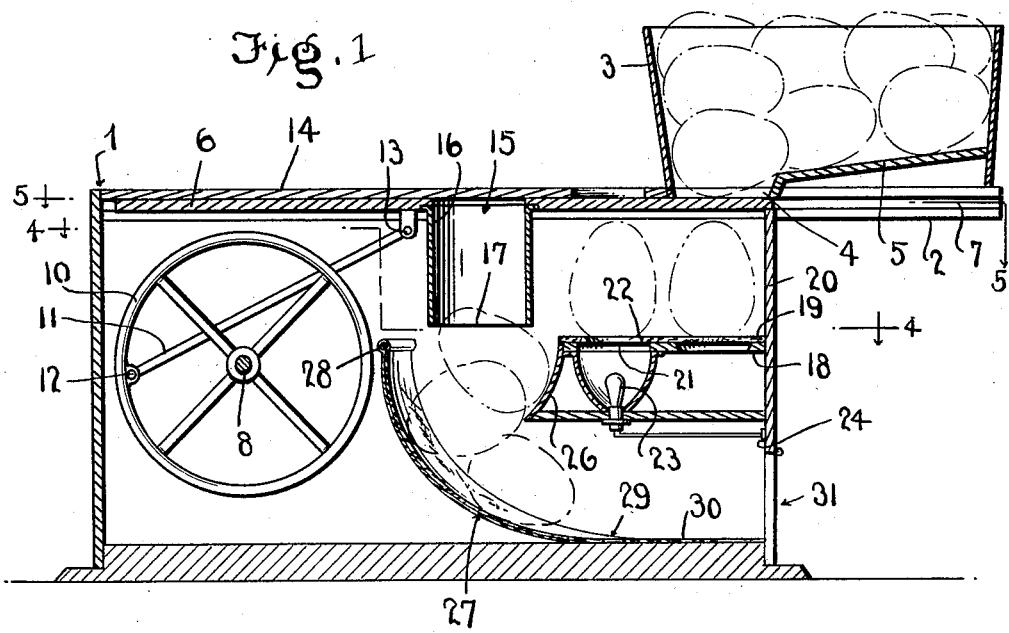

J. L. SMITH.
EGG TESTER.
APPLICATION FILED SEPT. 23, 1912.

1,056,953.

Patented Mar. 25, 1913.

2 SHEETS—SHEET 1.

Witnesses
L. B. James
N. L. Clamer

Inventor
J. L. Smith
By H. B. Willson & Co.
Attorneys

J. L. SMITH.
EGG TESTER.
APPLICATION FILED SEPT. 23, 1912.
1,056,953.
Patented Mar. 25, 1913.
2 SHEETS—SHEET 2.
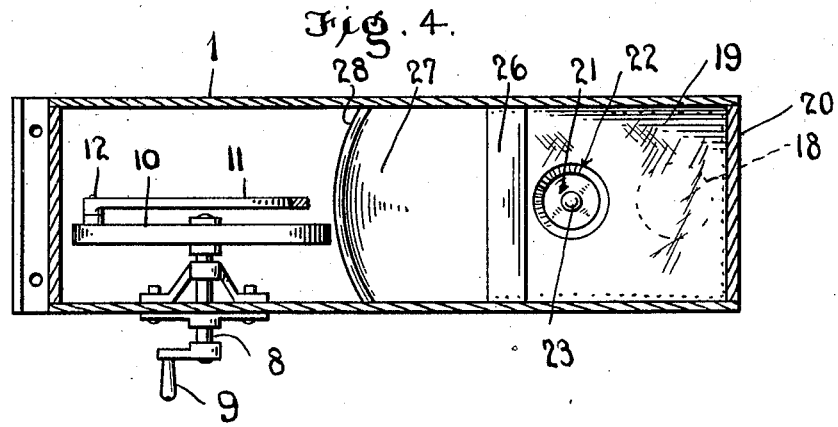
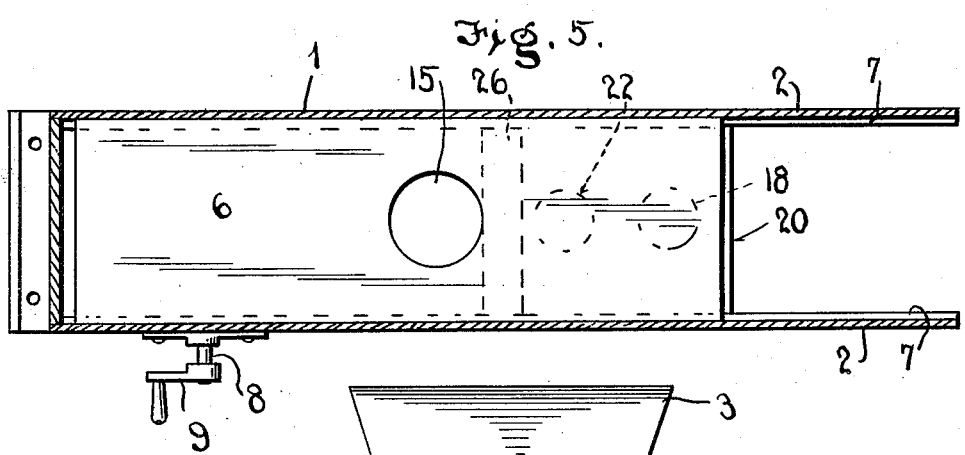
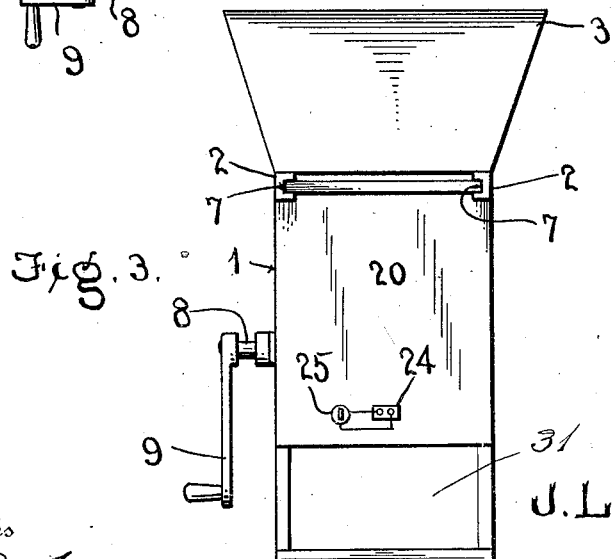
Inventor
J. L. Smith

UNITED STATES PATENT OFFICE.

JOHN L. SMITH, OF AZLE, TEXAS.

EGG-TESTER.

1,056,953.  Specification of Letters Patent.  Patented Mar. 25, 1913.

Application filed September 23, 1912. Serial No. 721,899.

*To all whom it may concern:*

Be it known that I, JOHN L. SMITH, a citizen of the United States, residing at Azle, in the county of Tarrant and State of Texas, have invented certain new and useful Improvements in Egg-Testers; and I do declare the following to be a full, clear, and exact description of the invention, such as will enable others skilled in the art to which it appertains to make and use the same.

This invention relates to the class of optics, and more especially to testing instruments; and the object of the same is to produce an improved egg tester.

To this end the invention consists in a machine comprising a hopper for the eggs, a light on a lower level than the mouth of the hopper but out of direct alinement with it, a reciprocating carrier between the hopper and light, and a delivery chute, whereby the eggs are taken automatically one at a time from the hopper and stood on end over the light for a moment so that the operator can inspect them, and later delivered through the chute onto a table or into a suitable receptacle.

The details of this invention are more fully set forth in the following specification and claims, and shown in the drawings wherein—

Figure 2:
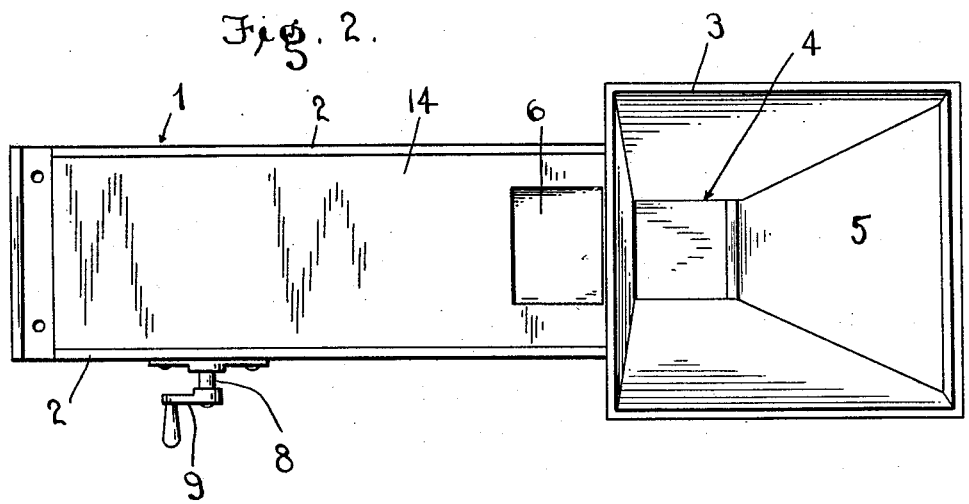

Figure 1 is a central vertical longitudinal section through this device, showing in dotted lines the course of an egg from the hopper to the outlet; and Fig. 2 is a plan view of the machine complete. Fig. 3 is a rear elevation of the machine; Figs. 4 and 5 are horizontal sections on the lines 4—4 and 5—5 respectively of Fig. 1.

While this machine may be built of any suitable materials and of any suitable size, in the embodiment herewith I have illustrated a machine capable of use by hand and in connection with the light, herein an electric bulb although of course it could be of some other type, and I will describe its details accordingly. The box-like casing 1 has its upper corner bars 2 projected at one extremity so that the hopper 3 may be carried between them and its mouth 4 at the bottom of its inclined bottom 5 will stand over the casing. At the top of the latter is a reciprocating carrier, here shown as consisting of a board or boards 6 slidably mounted in grooves 7 in the inner faces of said bars 2, and reciprocated in a horizontal plane beneath the mouth 4 of the hopper by means of crank mechanism herein shown as consisting of a shaft 8 having a crank handle 9 at its outer extremity and a wheel 10 inside the casing, and a pitman rod 11 connecting a crank pin 12 on said wheel with a point 13 on the carrier 6. The construction is such that when the crank handle is rotated the pitman rod causes the reciprocation of the carrier in a manner which will be understood. Above the inner end of the carrier 6 the box may be covered over as at 14, although this is not absolutely necessary; but beneath the rear or outer end of the carrier 6 the top of the box is open so as to permit the longitudinal movement therein of a tubular guide 16 which hangs from the carrier 6 and is of a size to receive the largest egg but to cause it to stand on end as shown in the drawings. The upper end of this guide communicates with an opening 15 in and through the carrier 6, whereas the lower end 17 of the guide is open.

Disposed within and across the interior of the casing is a shelf 18 whose upper surface is padded as at 19 at a point directly beneath the mouth 4 of the hopper 3 and preferably near the rear wall 20 of the casing, and a little farther inward or more remote from said wall the padded shelf is pierced with an opening 21 surrounded by a soft flange 22 of such size that the smallest egg cannot drop through the same. A light 23 stands beneath the center of the opening 21, and in the present case it is shown as an electric light whose terminals 24 extend to the exterior of the casing where they may be connected with a suitable source of electricity (not shown), a switch 25 being preferably introduced into the circuit at some suitable point so that the current may be cut off when desired. The innermost end of the shelf curves inward or forward as at 26 at a point yet farther from the rear wall 20 than the light and the opening above it; and disposed adjacent to said inner end 26 is a curved delivery chute 27, made of metal or other suitable material, possibly padded, and supported in any suitable way within the casing. The upper end 28 of this chute stands at a point above the lower end of the curved portion 26 of the shelf, and yet so low that the lower end of the guide 15 can never strike it, the body of the chute curves downward and rearward within the casing, and its lower end 29 leads onto the bottom 30 of the casing at an extremely gentle angle so that eggs rolling down the same will not become broken. Finally, the rear wall 20 of the casing preferably has an opening 31 out of which the tested eggs may roll into a receptacle or onto the table top, especially if the latter be covered with a towel or suitably padded so that the eggs cannot possibly become broken.

With the above construction of parts, the use of this machine is as follows: The hopper 3 may be filled with eggs and the entire device stood on the table top or other support whereby it is held at such height that the operator may grasp and rotate the crank handle 9. As he does so the carrier 6 reciprocates within its guides 7, and each time the tubular guide 16 comes under the hopper mouth 4, one egg drops into the same as shown in the drawings and falls onto the padded shelf 19. Further rotation of the reciprocating mechanism causes the retraction of the carrier 6 so that the egg is caused to slide along the shelf 19 until its lower end drops into the padded opening 21 immediately above the light. As there is no cover 14 over this portion of the casing, the operator by glancing down through the tubular guide 16 toward the light 23, can observe whether the axis of the egg seems clouded, for if so it is bad whereas if it be a good egg no cloud will be observed under this test. With a little practice he can soon train his eye to instantly detect the cloud indicating a bad egg, when the machine is run only sufficiently farther to cause the bad egg to be ejected onto the table top, when it is separated from the others. On the other hand, as long as he sees no cloud in an egg passing under his vision, he continues to rotate the crank, and the pitman rod 11 reciprocates the carrier so that eggs are constantly taken from the hopper and moved over the opening to be tested. Further action of the crank pin 12 causes the extreme retraction of the carrier 6 so that the tubular guide 15 moves inward beyond the padded opening 21, and the egg slides down the curved inner end 26 of the shelf 18 and into contact with the curved delivery chute 27; and as soon as it moves off the inner extremity of said end 26, it slides down the chute 27 onto the bottom 30 of the casing, and out the opening 31 into a suitable receptacle or onto a padded table top as will be clear.

I am aware that it is old to provide machinery for carrying eggs between the operator's eye and a light, but in most of the machines which I have seen the eggs must be accurately placed in some kind of a carrier before they can be thus tested.

A striking feature of the present invention consists in the fact that when the parts are made as described the reciprocating carrier automatically takes one egg at a time from the hopper, stands it on end, moves it over the light for an instant so that the operator can inspect it, and then drops it onto the delivery chute and passes it out of the machine onto a table top where the same or another operator can pick up the eggs rapidly and put them into their cellular cases for transportation to market. The rapid testing and handling of eggs in this manner, without liability of their becoming broken, is a necessity or at least a time saver to the poultryman who has many eggs to test.

On an extremely large scale the machine might be driven by power, and perhaps electric power, controlled by the same switch that controls the light, and the reciprocation of the carrier could be checked at any time a defective egg was found so that the latter might be removed; but I apprehend that the average poultryman will desire a hand-driven machine, with an electric light if his house be equipped with electricity or with a candle if not, and with its use could test his eggs and soon save enough time to pay for the cost of the machine.

What is claimed as new is:

1. An egg-handling machine comprising a hopper, a carrier reciprocating below the hopper and having an upright tubular guide of a size to receive one egg, the guide registering intermittently with the hopper-mouth, a padded shelf directly beneath said mouth, and a curved delivery chute adjacent the end of the shelf and beyond the path of movement of said guide.

2. An egg-handling machine comprising a hopper, a carrier reciprocating below the hopper and having an upright tubular guide of a size to receive one egg, the guide registering intermittently with the hopper-mouth, a padded shelf directly beneath said mouth and spaced therefrom a slightly greater distance than the length of the longest egg, the inner end of said shelf being curved inwardly, and an outwardly curved delivery chute co-acting with and spaced from said curved inner end a sufficient distance to permit the passage of the egg out of said tubular guide, past the extremity of the shelf, and down the chute, for the purpose set forth.

3. In an egg-handling machine, the combination with a casing whose upper corner bars are grooved in their inner faces and projected beyond the rear wall of the casing, a hopper carried by said bars and having its mouth standing above the casing, a carrier slidably mounted in said grooves, and a tubular guide depending from and communicating with an opening through said carrier at a point to move under the hopper-mouth, the internal size of the guide being sufficient to accommodate the largest egg; of a shelf immediately beneath the hopper-mouth, its upper surface being padded and its inner end curved inwardly, a delivery chute carried within the casing inside the inner end of said shelf and curving downward to the bottom of said casing, and means for reciprocating said carrier.

4. In an egg-handling machine, the combination with a casing whose upper corner bars are grooved in their inner faces, a hopper carried by said bars, a carrier slidably mounted in said grooves and adapted to move under the hopper mouth, and means for reciprocating said carrier; of a shelf immediately beneath the hopper-mouth, its upper surface being padded and its inner end curved inwardly, and a delivery chute carried within the casing inside the inner end of said shelf and curving downward to the bottom of said casing.

5. In an egg-testing machine, the combination with a casing whose upper corner bars are grooved in their inner faces, a hopper carried by said bars, a carrier slidably mounted in said grooves and adapted to move under the hopper mouth, and means for reciprocating said carrier; of a padded shelf immediately beneath the hopper-mouth and having an aperture out of alinement with such mouth, a soft flange surrounding said aperture and of a size smaller than the smallest egg, a light beneath said aperture, and a delivery chute for catching the eggs after they are drawn by the carrier across said light-opening and off the inner end of said shelf.

6. In an egg-testing machine, the combination with a box-like casing having an opening in the lower portion of its rear end and in the rear portion of its cover and guides in the inner faces of its upper corner bars, a hopper carried by the casing and whose mouth is disposed over the rear portion of said opening through its cover leaving the front portion of this opening exposed, and a reciprocating carrier mounted in said guides and having an opening adapted to pass under the hopper mouth, under the space through the cover of the casing, and yet farther forward in the latter; of a shelf within said casing extending from its rear end forward under the open portion of the casing cover, the shelf being padded at its rear portion and having a light-opening in its front portion, and a delivery chute carried within the casing with its upper end forward of the inner end of said shelf and its body curving downward to the bottom of the casing and directed to the opening through the rear wall of the latter, for the purpose set forth.

In testimony whereof I have hereunto set my hand in presence of two subscribing witnesses.

J. L. SMITH.

Witnesses:
G. C. HALEY,
W. H. TANNER.

---

Copies of this patent may be obtained for five cents each, by addressing the "Commissioner of Patents, Washington, D. C."